United States Patent [19]

Habermann et al.

[11] Patent Number: 4,899,993
[45] Date of Patent: Feb. 13, 1990

[54] BREAKAWAY TOOL ASSEMBLY

[75] Inventors: Harley R. Habermann, Hartford; Gerald D. Karow, Bayside, both of Wis.

[73] Assignee: Messer.Griesheim Industries, Inc., Valley Forge, Pa.

[21] Appl. No.: 284,240

[22] Filed: Dec. 14, 1988

[51] Int. Cl.$^4$ .............................................. B23K 7/10
[52] U.S. Cl. ...................................................... 266/77
[58] Field of Search ........................ 266/48, 77, 68, 76

[56] References Cited

U.S. PATENT DOCUMENTS

| | | | |
|---|---|---|---|
| 2,373,541 | 4/1945 | Chelborg et al. | 266/77 |
| 4,333,636 | 6/1982 | Wajtkowicz | 266/77 |
| 4,695,041 | 9/1987 | Clites | 266/77 |

FOREIGN PATENT DOCUMENTS 0694305  10/1979  U.S.S.R. ................................ 266/77

Primary Examiner—S. Kastler
Attorney, Agent, or Firm—Andrus, Sceales, Starke & Sawall

[57] ABSTRACT

A breakaway mounting assembly for a cutting torch or other non-contact tool includes a tool mounting collar with an outer frustoconical bearing surface adapted to be received in an annular support ring having a complimentary inner frustoconical bearing surface providing precision torch positioning. Resilient spring-biased detents hold the torch and mounting collar in the operating position, but are deflected in the event the torch collides with an obstruction, allowing the torch to be dislodged from the mounting without damage. The dislodged torch can be remounted with a simple snap-in action and precise realignment is automaticaly established. A switch which is activated by displacement between the supporting frustoconical bearing surfaces may be used to signal the operator or cause an appropriate response in the torch carriage operating system.

14 Claims, 2 Drawing Sheets

BREAKAWAY TOOL ASSEMBLY

BACKGROUND OF THE INVENTION

The present invention relates to a mounting assembly for a non-contact tool and, more particularly, to a breakaway assembly by which such a tool may be displaced from its mounting without damage as a result of encountering an obstacle in its operating path.

Non-contact tools, such as oxyfuel or plasma cutting torches, are used in a variety of applications where the tool is mounted to a carriage for movement relative to but spaced from a workpiece to be operated upon. In particular, oxyfuel or plasma cutting torches are used to cut a variety of sizes and shapes from steel plate. The plate is generally supported on a work table and the cutting torch or a bank of cutting torches is supported by an overhead carriage for programmed cutting movement over the steel plate workpiece.

As the cutting torch or torches move over the surface of the plate being cut, cut or partially cut pieces and scraps often fail to fall completely to an underlying support on the cutting table and instead tilt upwardly resulting in so-called "tip-ups" which may lie directly in the path of and be struck by the tip of the torch. Although it is well known in the art to automatically control torch height and positioning relative to the workpiece to maintain a proper torch position, the automatic detection of tip-ups or other obstructions has not been successfully overcome. Therefore, occasional collisions between a torch and an obstruction is unavoidable and quite common. The usual result of a torch collision is either major misalignment of the torch or damage to the torch and/or carriage mechanism. Thus, in addition to requiring major realignment by qualified technicians, expensive repairs may also be required.

Continuing developments in two areas of the plate cutting art have compounded the problems of torch misalignment and damage resulting from collision obstructions. First of all, the continued development of plasma cutting systems has compounded the problem of manual control by the operator to detect and avoid collisions. Plasma systems cut much more rapidly than gas torches and, as a result, much less time is available for operator reaction to avoid collision with a tip-up, the side of the cutting table, or some other obstruction. In addition, the plasma cutting arc is typically shielded by a water muffler or by cutting under water, making the visual detection of tip-ups increasingly difficult if not impossible. Also, improvements in guidance and control systems have enhanced the accuracy of both oxyfuel and plasma cutting systems, but have consequently required much greater accuracy in realigning and repositioning torches which have collided with an obstruction.

There is, therefore, a need for a non-contact tool mounting system, such as may be used for oxyfuel or plasma cutting torches, which will allow the tool or torch to break away without damage when it encounters an obstruction and yet be easily repositioned and realigned for continued operation. Such a tool mounting system must be able to maintain a precision operating position during cutting, be easily displaced from the operating position if it encounters an obstruction, and be subsequently repositioned quickly and accurately in the same precision operating position. It would also be desirable to automatically provide the operator with a signal that a collision has occurred, or to temporarily interrupt or shutdown the cutting process.

SUMMARY OF THE INVENTION

In accordance with the present invention, a non-contact tool is held in its mounting with resiliently biased retaining means which are adapted to react uniformly as a result of a torch collision from any direction to allow the torch to be dislodged from its mounting. The resilient biasing means are similarly displaceable to allow repositioning the tool in the holder with a simple snap-in movement. The tool and holder are provided with mating bearing surfaces providing precise tool location and the reestablishment of that position after displacement as a result of a collision. A switch means operable as a result of relative displacement of the mating bearing surfaces may be utilized to generate a signal to the operator or to provide an automatic control signal to the tool carriage mechanism.

In a preferred embodiment, the assembly includes a mounting collar for the cutting torch or other non-contact tool which has a downwardly facing frustoconical bearing surface by which the mounting collar is held in a support ring attached to the carriage mechanism, the support ring having an upwardly facing frustoconical bearing surface having the same angle as the bearing surface on the mounting collar. The direct surface-to-surface bearing contact between the mating frustoconical surfaces provides a precise means of positioning the tool which is insensitive to relative axial rotation between the mounting collar and the supporting ring. Resilient biasing means are attached to the support ring and engage the mounting collar to retain the precision surface-to-surface bearing contact, but allow the mounting collar and tool to be displaced from the precision operating position in response to the force of a collision between the tool and an obstacle in its path of movement. The resilient biasing means preferably includes a series of spring biased detents disposed in equally spaced relation around the circumferential edge of the mounting collar and having a deflectable surface disposed in engagement with an upwardly convergent frustoconical surface on the mounting collar. The spring biased detents exert a holding force on the mounting collar and attached tool which has uniform radial and axial components sufficient to hold the working position of the torch during normal operation.

The surface engaging portions of the spring biased detents are semispherical to facilitate omnidirectional displacement of the mounting collar and tool in the event of a collision and reattachment thereof with a simple snap-in movement without regard to relative rotational displacement between the mounting collar and supporting ring about their common axis.

The breakaway mounting assembly of the present invention is suitable for use with oxyfuel gas and plasma torches, as well as other types of noncontact tools.

DETAILED DESCRIPTION OF THE PREFERRED EMBODIMENT

Figure 1:
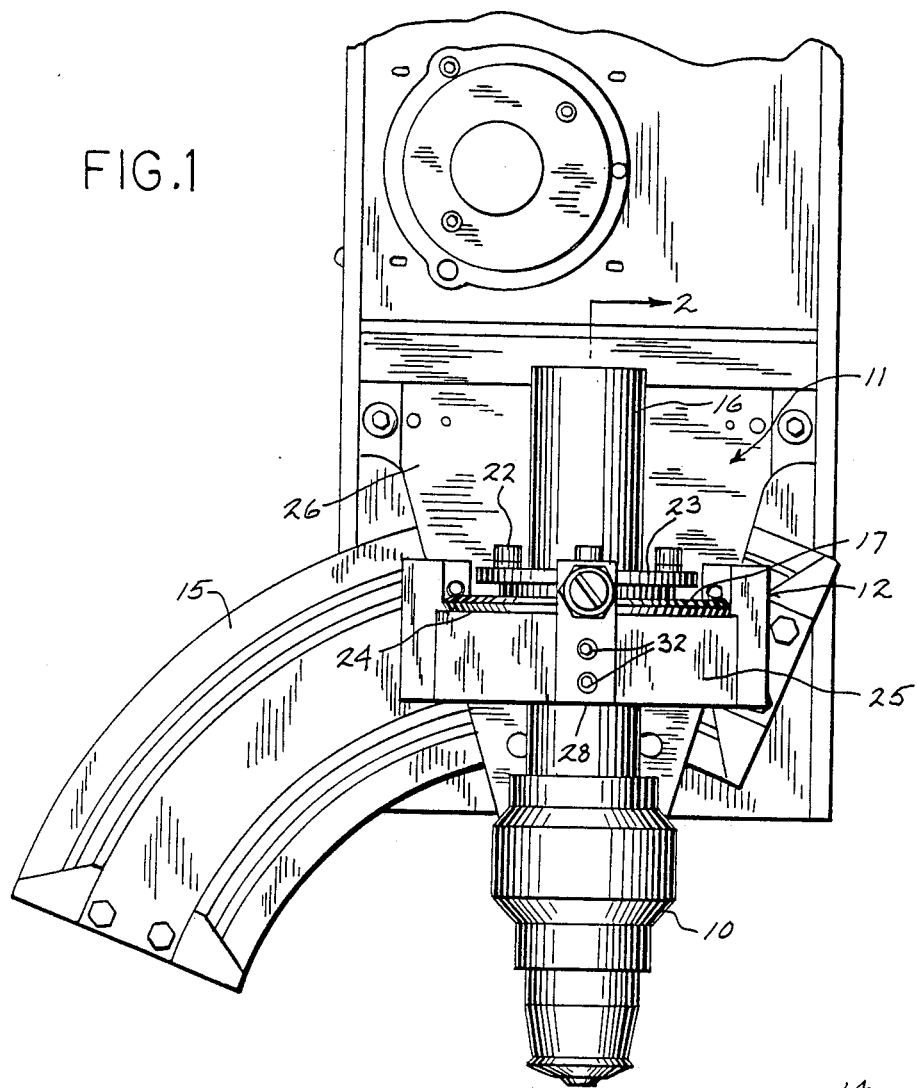
FIG. 1 is a front elevation of a cutting torch apparatus including the breakaway mounting assembly of the present invention, and additionally showing a portion of the carriage mechanism and the cutting table and workpiece over which the carriage mechanism moves the torch.

In the drawing, FIG. 1 shows a cutting torch 10 mounted on a carriage 11 with a breakaway mounting assembly 12 of the present invention. The carriage 11 supports the torch and mounting assembly above a cutting table 13 for movement relative to a workpiece in the form of a steel plate 14. The carriage 11 is typically mounted on a bridge (not shown) for linear movement in opposite directions along it. The bridge, in turn, is mounted on a gantry (also not shown) for movement transverse to the axis of the bridge. The carriage may also include a circular track sector 15 over which the torch 10 and mounting assembly 12 may be moved to tilt the torch to provide beveled cuts. The tip of the torch 10 is always maintained spaced above the plate 14 or other workpiece, but is typically closely spaced therefrom with a spacing of less than 1" being common. The plasma arc from the plasma torch 10 shown (or the flame from an oxyfuel torch, if used) provides the cutting action.

A typical cutting table 13 is designed to hold the parts cut from the plate 14 and to retain the scrap pieces. However, the typical supporting gridwork on the table under the plate sometimes results in the tilting of the cut pieces or scraps such that they result in tip-ups which can be struck by the torch tip as it travels over the plate. If the tip-up is part of a large piece or if it is not completely severed and still rigidly attached to the plate, a collision with it by the torch can easily knock the torch out of alignment and cause serious damage.

Figure 3:
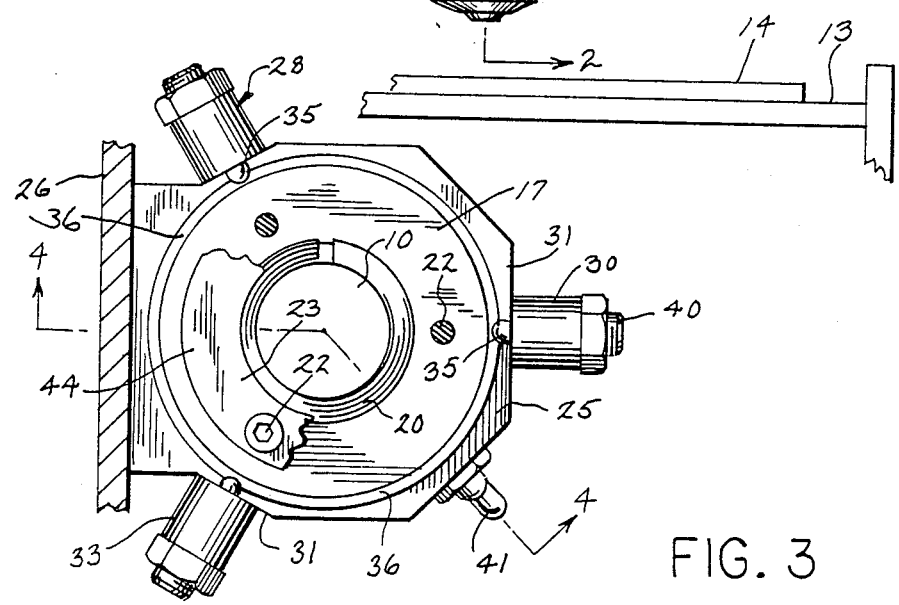
FIG. 3 is a top plan view of the torch and mounting assembly shown in FIG. 2.
Figure 2:
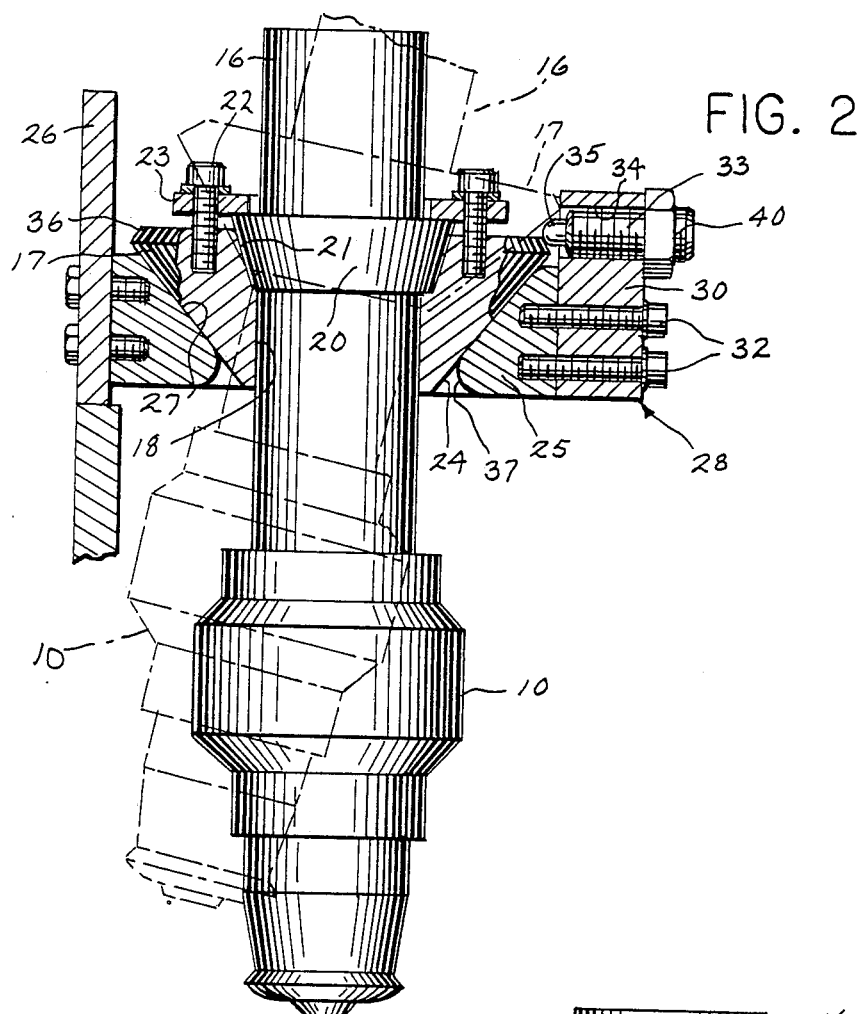
FIG. 2 is an enlarged vertical section, taken on line 2—2 of FIG. 1, showing the cutting torch and breakaway mounting assembly.

Referring also to FIGS. 2 and 3, the torch 10 has a cylindrical body 16 extending upwardly from the tip and by which the torch is attached to the mounting assembly 12. It is understood, of course, that in lieu of a plasma or oxyfuel torch, another type of non-contact tool may be mounted to the assembly in a manner to be described hereinafter in more detail.

The torch 10 is attached to a mounting collar 17 by securing the cylindrical body 16 of the torch in an axial opening 18 in the collar 17. The torch body 16 may be secured in the mounting collar against axial displacement by means of a conventional split tapered bushing 20 which is wedged between a tapered ID 21 in the collar and the cylindrical surface of the torch body by a series of clamping bolts 22 extending through a bushing flange 23 into suitably tapped holes in the upper surface of the mounting collar 17.

The mounting collar 17 is provided with a downwardly facing outer frustoconical bearing surface 24. A support ring 25 for the mounting collar 17 is rigidly attached to a carriage mounting plate 26 which, in turn, is operatably connected to the carriage 11 to provide controlled programmed movement to the torch, all in a manner well know in the art. The support ring 25 has an annular opening defined by an upwardly facing inner frustoconical bearing surface 27. The outer bearing surface 24 on the mounting collar 17 and the inner bearing surface 27 on the support ring 25 have the same cone angle so that when the mounting collar 17 is placed in the support ring 25 there is direct surface-to-surface bearing contact between the adjoining frustoconical surfaces 24 and 27. Thus, when the mounting collar 17 and attached torch are seated and held in the support ring 25, precise positioning of the torch may be maintained.

The mounting collar is retained in the support ring by a series of detent assemblies 28 which are attached to the support ring and resiliently engage the outer circumference of the mounting collar. The preferred arrangement includes three detent assemblies 28 disposed in equally spaced relation around the circumference of the mounting collar 17. Each detent assembly includes a supporting body 30 attached to a suitable flat surface 31 on the periphery of the support ring 25 by means of a pair of mounting bolts 32. The body 30 of each detent assembly 28 extends upwardly above the upper surface of the mounting collar 17 and is spaced radially outward of the outer circumferential edge of the collar. A spring biased detent 33 is mounted in a through bore 34 in the upper end of the body 30. The axes of the bores are disposed in the same horizontal plane and extend radially to a common point of intersection on the vertical axis of the torch body. Each detent includes a semispherical end portion 35 adapted to engage the outer circumferential surface of the mounting collar 17 and to be deflected along the axis of the bore 34 against the bias of an internal coil spring (not shown). Specifically, the semispherical end portions 35 of the detents 33 engage a narrow upwardly convergent frustoconical surface 36 around the upper edge of the mounting collar immediately above the main outer bearing surface 24. The spring biased engagement of the detent end portions 35 with the narrow frustoconical surface 36 secures the mounting collar and torch in the support ring 25 with a uniform force acting radially inwardly and downwardly to maintain surface-to-surface contact between the frustoconical bearing surfaces 24 and 27.

Should the tip of the torch 10 encounter an obstruction as it traverses the cutting table 13, the force of the collision will be transmitted to the mounting collar and cause a deflection of one or more of the detents and, as a result, the mounting collar and attached torch will pop out of the mounting assembly and assume, for example, a position such as that shown in phantom in FIG. 2. Once the mounting collar has popped out of its retained position it is free for substantial movement in all directions should the obstruction cause the torch tip to be deflected by a substantial amount. To help facilitate substantial torch displacement, the frustoconical bearing surface 27 on the support ring 25 is provided at its lower end with a generous radius portion 37 defining the transition between the bearing surface 27 and the lower annular surface 39 of the support ring. The radius portion 37 not only provides additional clearance, but eliminates a potentially sharp edge which could damage the body 16 of the torch deflected as a result of a collision with a tip-up or the like. Similarly, the upper end of the frustoconical bearing surface 27 may be provided with a radiused edge 38 defining its transition to the annular upper surface 44. The radiused edge 38 facilitates rocking movement of the complimentary frustoconical bearing surface 24 of the mounting collar 17 when it is dislodged from the mounting assembly.

Each detent assembly 28 includes an adjusting screw 40 by which the resilient bias, and thus the force by which the mounting collar is retained in the support ring, may be varied. The narrow frustoconical surface 36 engaged by the end portions 35 of the detents is, in the preferred embodiment, disposed at an angle of 30° with respect to the horizontal (or a cone angle of 120°).

In general, an angle from the horizontal of less than 45° will require a somewhat large horizontal force component than a vertical component of force to cause displacement. However, various other surface angles may be used. The frustoconical bearing surfaces 24 and 27 are, in the disclosed embodiment, disposed at a 45° angle from the horizontal (or a cone angle of 90°). This angle is preferred, but is not believed to be critical. A variation in the angle of these complimentary surfaces of at least ±10° may be utilized.

Figure 4:
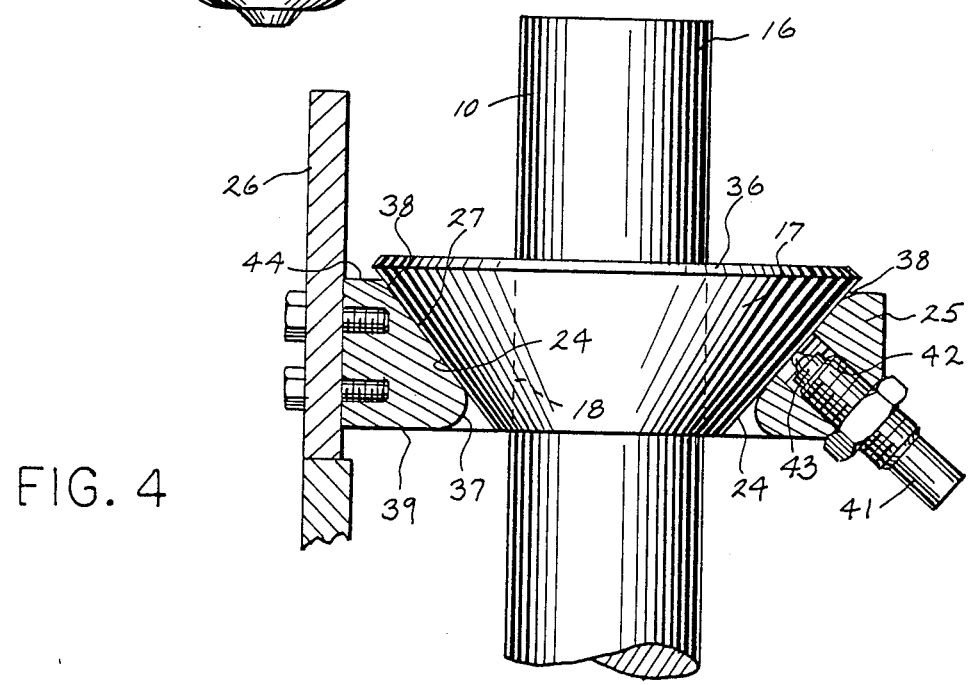
FIG. 4 is a vertical section taken on line 4—4 of FIG. 3.

As is best shown in FIG. 4, an electrical switch 41 is mounted in an angled bore 42 in the support ring 25 and has a spring biased plunger or triggering mechanism 43 which is depressed against the bias spring (not shown) by the outer frustoconical bearing surface 24 of the mounting collar when the collar is retained in its operating position. Dislodgement or displacement of the mounting collar removes the switch trigger bias and operates the switch. Switch operation may be utilized to generate a visual and/or audible signal to the operator, or may be connected to a control system for the carriage mechanism to cause an appropriate response in the movement thereof. Only a single switch 41 is required and, regardless of the direction of the force on the torch tip causing displacement, complete loss of surface-to-surface contact between the frustoconical bearing surfaces 24 and 27 will always occur, thus assuring operation of the switch.

Cutting systems utilizing plasma torches are particularly suitable for use with the breakaway mounting system of the present invention, both because of the high speed at which these systems operate and because the plasma torch and arc are often shielded. In either case, the ability of the operator to sense and react to a collision is substantially inhibited compared to a conventional, slower operating oxygen-gas fuel cutting system.

After the tip-up or other obstruction resulting in the torch collision and displacement from the mounting assembly has been eliminated, the operator may simply press the mounting collar and attached torch downwardly into the support ring 25. Such movement will cause the outer frustoconical bearing surface 24 on the mounting collar to engage and displace the spring biased end portions 35 of the detents 33 until the extreme outer edge of the mounting collar passes the semispherical ends, whereupon the detents will pop out and the mounting collar will snap into place. The precise mounting position is reestablished quickly without any tedious and time consuming realignment procedure.

We claim:

1. In an apparatus for mounting a noncontact tool for movement with a carriage mechanism relative to a workpiece normally spaced from the tool, a breakaway tool mounting assembly comprising:
   an annular mounting collar supporting the tool generally on the axis of the collar, said collar having a downwardly facing outer frustoconical surface;
   a support ring attached to the carriage mechanism and having an annular opening defined by an upwardly facing inner frustoconical surface;
   said outer and inner frustoconical surfaces each defining the same cone angle such that the mounting collar is received in the annular opening in the support ring with said surfaces in direct bearing contact and with the tool depending generally downwardly through said annular opening; and,
   resiliently biased retaining means attached to the support ring and in engagement with an outer circumferential portion of the mounting collar to maintain direct bearing contact between said surfaces and to allow the collar to be dislodged from said bearing contact in response to unintended contact between the tool and an object in its path of movement.

2. The assembly as set forth in claim 1 wherein said retaining means comprises at least three spring biased detents disposed equally spaced around the mounting collar and in engagement with an outer surface thereof.

3. The assembly as set forth in claim 2 wherein the outer engagement surface on the mounting collar is frustoconical.

4. The assembly as set forth in claim 3 wherein the surface engaging portions of the spring biased detents are semispherical.

5. The assembly as set forth in claim 4 wherein the spring biased detents are disposed to provide biasing movement radially of the mounting collar.

6. The assembly as set forth in claim 3 wherein the frustoconical engagement surface defines a cone angle greater than 90°.

7. The assembly as set forth in claim 2 wherein said spring biased detents are adjustable to provide a variable biasing force.

8. The assembly as set forth in claim 1 wherein the tool is demountably attached to the mounting collar.

9. The assembly as set forth in claim 1 including means for detecting the loss of bearing contact between said outer and inner frustoconical surfaces and for generating a signal representative of said loss of contact.

10. The assembly as set forth in claim 9 wherein said detecting means comprises a switch mounted on the support ring and having a trigger mechanism biased into engagement with said outer frustoconical surface.

11. A breakaway mounting assembly for a noncontact tool comprising:
   a carriage mechanism mounting the tool for relative movement with respect to a workpiece normally spaced from the tool;
   a mounting collar supporting the tool and having a downwardly facing outer frustoconical bearing surface;
   a support ring attached to the carriage mechanism and having an upwardly opening inner frustoconical bearing surface defining a cone angle equal to that of said outer bearing surface, said mounting collar received and supported in the support ring with said bearing surfaces in direct surface-to-surface contact; and,
   resilient biasing means interconnecting the support ring and the mounting collar to normally maintain said surface-to-surface contact and to allow the collar to be displaced from said contact in 20 response to contact between the tool and an object in its path of movement.

12. The assembly as set forth in claim 11 wherein said biasing means comprises:
   a series of mounting arms attached to the support ring in equally spaced relation around the outer edge thereof, each of said arms having an upper end disposed above and radially outward of the outer circumferential edge of the mounting collar; and,
   a spring biased detent mounted on the upper end of each mounting arm, each detent having a deflectable surface engaging end portion extending radially inwardly into engagement with the outer circumferential edge of the mounting collar.

13. The assembly as set forth in claim 12 wherein the end portion of the detents are semispherical, and outer circumferential edge of the mounting collar comprises an upwardly convergent frustoconical surface.

14. The assembly as set forth in claim 11 comprising upper and lower annular surfaces on said support ring and wherein the upper and lower ends of the inner frustoconical bearing surface are provided with radius portions defining the transition of said bearing surface to said upper and lower annular surfaces.

* * * * *